United States Patent [19]
Durand

[11] Patent Number: 5,385,457
[45] Date of Patent: Jan. 31, 1995

[54] NUTATING POSITIVE DISPLACEMENT DEVICE HAVING A MAGNETIC ELEMENT WIRE SENSING ARM

[76] Inventor: John E. Durand, 26581 Dolorosa, Mission Viejo, Calif. 92691

[21] Appl. No.: 113,019

[22] Filed: Aug. 30, 1993

[51] Int. Cl.⁶ ............................ F01C 1/06; F01C 17/00
[52] U.S. Cl. .................................... 418/58; 418/135; 73/256; 324/207.13
[58] Field of Search ............... 418/58, 135, 158, 208; 73/256, DIG. 5; 324/207.13, 207.22, 207.24, 226

[56] References Cited

U.S. PATENT DOCUMENTS

| | | | |
|---|---|---|---|
| 1,312,838 | 8/1919 | Dembowsky | 418/58 |
| 1,539,728 | 5/1925 | Ensign | 418/135 |
| 2,993,375 | 7/1961 | Whittaker | 418/158 |
| 3,240,157 | 3/1966 | Hinckley | 418/158 |
| 4,484,863 | 11/1984 | Pagel | 418/135 |

Primary Examiner—John J. Vrablik

[57] ABSTRACT

A positive displacement device is presented. The mechanism comprises a nutator capable of nutating within a nutating chamber defined by the interior surface of the body of the positive displacement device between an inlet into and an outlet out of the positive displacement device, an inverted pendulous, low friction, substantially non-sliding nutator, vertically elongated double pivoting fulcrum; a magnetic signal pickup mechanism comprising a pivoting cruciform shaped magnet element low inertia wire magnetically tracking a nutator and a means of sensing movement; a third magnetic element to dampen or amplify movement of the cruciform wire; a balance plate bearing on the basic elements of the positive displacement device by means of a resilient spring force; and static elements which provide magnetic attraction to the moving elements effecting a sealing influence between the static and moving elements.

4 Claims, 3 Drawing Sheets

NUTATING POSITIVE DISPLACEMENT DEVICE HAVING A MAGNETIC ELEMENT WIRE SENSING ARM

BACKGROUND OF THE INVENTION

1 Field of the Invention

The present invention relates to positive displacement nutating devices, flowmeters, hydraulic/pneumatic/mechanical mechanisms and ultra low flow rate flowmeters.

2. Description of the Prior Art

The prior art flowmeters comprise piston in sleeve arrangements which cannot be used for most of the applications for which the present invention is suited.

One cycle event by the present device can resolve 1CC into 100 parts. In contrast, the prior art piston and sleeve arrangements are about 100 times less sensitive.

Intravenous fluids must sometimes be administered in extremely small quantities. The present device can monitor intravenous administations on the order of 1 CC per hour.

The present device can measure up to at least 1000 Hertz and down to at least 0.05 Hertz in hydraulic/pneumatic/mechanical mechanisms. Under certain circumstances, the present device can measure events having a frequency of less than one event per year.

SUMMARY OF THE INVENTION

A nutating positive displacement device including a magnetic signal pickup mechanism is presented.

The mechanism includes a cruciform shaped magnetic element wire symmetrical in the x, y and z axes. The wire comprises a sensing arm which is a bottom arm, a counterbalance arm comprising a top arm, and two coaxial pivot arms comprising left and right arms. All four arms extend from a center point, The magnetic element wire has a small moment of inertia. The ends of the right and left arms are non-rigidly rotatably coupled to pivot means. In operation, the wire pivots in bearings as a function of movement of a magnetic element mass.

The moving magnetic element mass is fixedly coupled to a moving element proximate to the end of the bottom sensing arm of the magnetic element wire but separated from the magnetic element wire by a magnetically permeable barrier. The moving magnetic element by moving causes the magnetic element wire to move by tracking the moving magnetic element mass. The moving magnetic element mass is one of ferro-magnetic or a permanent magnet and the magnetic element wire is the other of a permanent magnet or ferro-magnetic. When the wire is a magnet, the mass is ferro-magnetic. When the wire is ferro-magnetic, the mass is a magnet.

Sensing means known to the prior art sense the movement of the magnetic element wire. One example of sensing means could be optical sensing means.

A third magnetic element comprises a permanent magnet selectively fixedly positioned adjacent the magnetic element wire to amplify or dampen the amplitude of movement of the magnetic element wire as a function of the movement of the magnetic element mass.

A nutating positive displacement device includes a nutator capable of nutating within a nutating chamber defined by the interior surface of the body of the positive displacement device between an inlet into and an outlet out of the positive displacement device, an inverted pendulous, low friction, substantially non-sliding nutator vertically elongated double pivoting fulcrum.

The fulcrum is one member comprising a bottom base coupled to a central beam coupled to a top nutator support bearing surface. The bottom of the fulcrum comprises a pivoting base pivotally and substantially non slidingly mating with a base receptacle defined by a body interior surface. The base 18 coupled to the fulcrum beam which in turn supports the fulcrum nutator support bearing surface. Both ends of the substantially non slidng nutator vertically elongated double pivoting fulcrum are shaped to an effective diameter whose length is the length of the substantially non sliding nutator vertically elongated double pivoting fulcrum, thereby causing the top nutator support bearing to move in a straight line. The nutator support bearing surface pivotally and substantially non slidingly mates with a nutator restraint defined by the center bottom surface of the nutator.

A positive displacement device has a balance plate bearing on the basic elements of the positive displacement device by means of a resilient spring force eliminating or minimizing effects of internal pressure upon the accuracy of the device and of mechanical forces used to maintain the integrity between the housing members of the positive displacement device.

A positive displacement device includes static elements which provide magnetic attraction to the moving elements effecting an additive influence of sealing between the static and moving elements with consequential improvement in positive displacement qualities.

DRAWING DESCRIPTION

Reference should be made at this time to the following detailed description which should be read in conjunction with the following drawings of which:

DETAILED DESCRIPTION OF THE INVENTION

A nutating positive displacement device 10 including a magnetic signal pickup mechanism 45 is presented.

Figure 1:
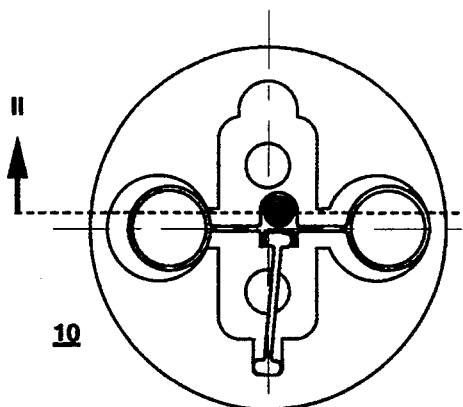
FIG. 1 is a cutaway view of a nutating positive displacement device along the line I—I of FIG. 2, depicting the magnetic element mass in its farthest right position.
Figure 3:
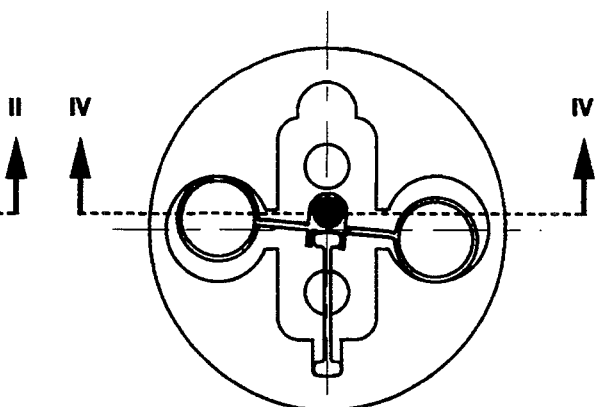
FIG. 3 is a cutaway view of the nutating positive displacement device of FIG. 1 with the magnetic element mass in the central position of its travel.
Figure 2:
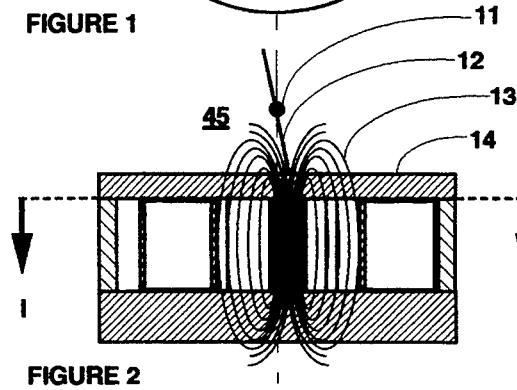
FIG. 2 is a cutaway view of the nutating positive displacement device of FIG. 1 along the line II—II of FIG. 1, depicting the magnetic element wire tracking the magnetic element mass.
Figure 4:
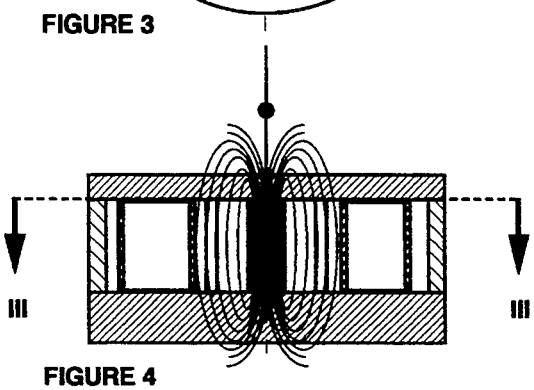
FIG. 4 is a cutaway view of the nutating positive displacement device of FIG. 3 along the line IV—IV of FIG. 3 depicting the magnetic element wire tracking the magnetic element mass.
Figure 5:
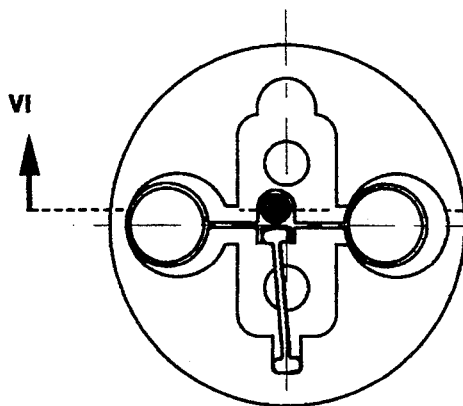
FIG. 5 is a cutaway view of the nutating positive displacement device of FIG. 1 with the magnetic element mass in the farthest left position of its travel.
Figure 7:
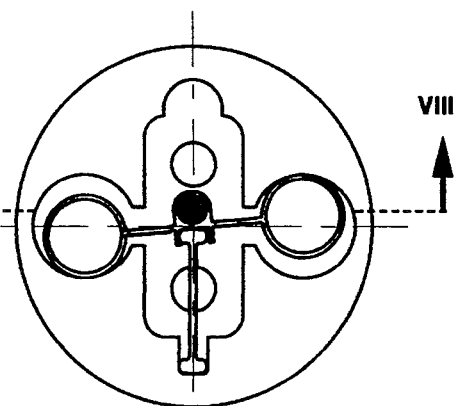
FIG. 7 is a cutaway view of the nutating positive displacement device of FIG. 3 with the magnetic element mass in the central position of its travel 180 degrees out of phase with the magnetic element mass of FIG. 3.
Figure 6:
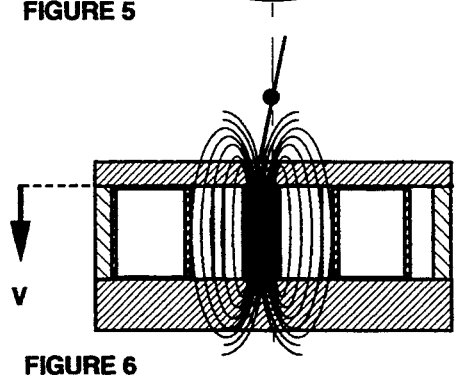
FIG. 6 is a cutaway view of the nutating positive displacement device of FIG. 5 along the line VI—VI of FIG. 5, depicting the magnetic element wire tracking the magnetic element mass.
Figure 8:
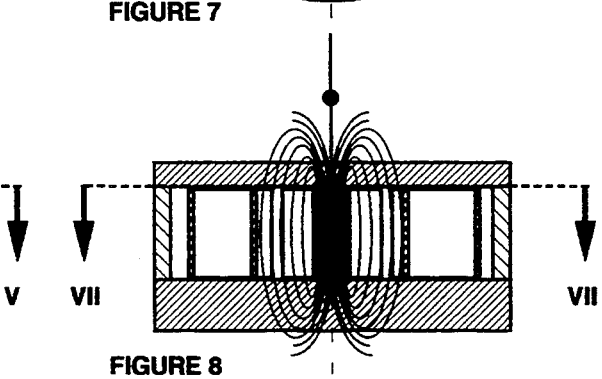
FIG. 8 is a cutaway view of the nutating positive displacement device of FIG. 7 along the line VIII—VIII of FIG. 7.
Figure 9:
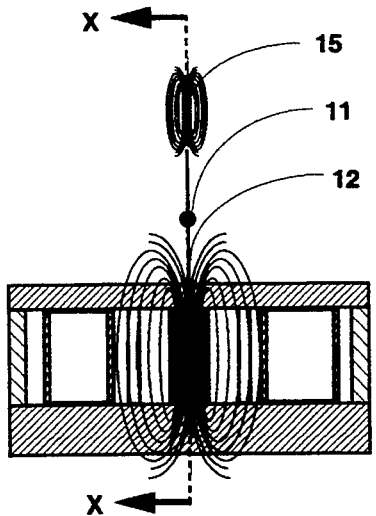
FIG. 9 depicts the positive displacement nutating device of FIG. 6 with a third magnetic element added.
Figure 10:
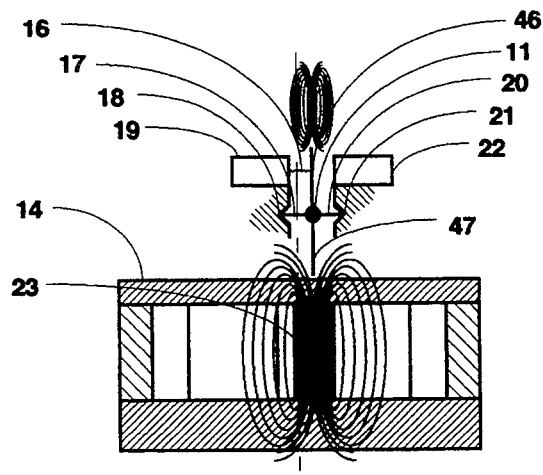
FIG. 10 is a cutaway view of the nutating positive displacement device of FIG. 9 along the line X—X of FIG. 9.

The mechanism 45 includes a cruciform shaped magnetic element wire 12 symmetrical in the x, y and z axes. The x and y axes are the arms 17, 20 and 46, 47 of the cruciform and the z axis is perpendicular to the x and y axes. The wire 12 (FIG. 10) comprises a sensing arm 47 which is a bottom arm 47, a counterbalance arm comprising a top arm 46, and two coaxial pivot arms 17, 20 comprising left arm 17 and right arm 20. All four arms 47 extend from a center point 11. The magnetic element wire 12 has a small moment of inertia. The ends of the right and left arms 20, 17 are non-rigidly rotatably coupled to pivot means 18, 21. In operation, the wire 12 pivots in the pivot means 18, 21 which act as bearings 18, 21 as a function of movement of a magnetic element mass 23.

The moving magnetic element mass 23 is inserted into a cavity of the nutator 33 and coupled to a moving element 47 proximate to the end of the bottom sensing arm 47 of the magnetic element wire 12 but separated from the magnetic element wire 12 by a magnetically permeable barrier 14. The moving magnetic element 23 by moving causes the magnetic element wire 12 to move by tracking the moving magnetic element mass 23. The moving magnetic element mass 23 is one of ferro-magnetic material or a permanent magnet and the magnetic element wire 12 is the other of a permanent magnet or ferro-magnetic material. When the wire 12 is a magnet, the mass 23 is ferro-magnetic. When the wire 12 is ferro-magnetic, the mass 23 is a magnet.

Sensing means known to the prior art sense the movement of the magnetic element wire. One example of sensing means could be optical sensing means 16, 19, 22.

A third magnetic element 15 comprises a permanent magnet 15 selectively fixedly positioned adjacent the magnetic element wire 12 to amplify or dampen the amplitude of movement of the magnetic element wire 12 to amplify or dampen the amplitude of movement of the magnetic element wire 12 as a function of the movement of the magnetic element mass 23.

A nutating positive displacement device 10 (FIG. 11) includes a nutator 33 capable of nutating within a nutating chamber 32 defined by the interior surface 32 of the body 35 of the positive displacement device 10 between an inlet 24 into and an outlet 26 out of the positive displacement device 10, an inverted pendulous, low friction, substantially non-sliding nutator 33 vertically elongated double pivoting fulcrum 27.

The fulcrum 27 is one member comprising a bottom base 29 coupled to a central beam 48 coupled to a top nutator support bearing surface 37. The bottom 29 of the fulcrum 27 comprises a pivoting base 29 pivotally and substantially non slidingly mating with a base receptacle 28 defined by a body 35 interior surface 28.

The base 29 is coupled to the fulcrum beam 48 which in turn supports the fulcrum nutator support bearing surface 37. Both ends of the substantially non sliding nutator 33 vertically elongated double pivoting fulcrum 27 are shaped to an effective diameter whose length is the length of the substantially non sliding nutator vertically elongated double pivoting fulcrum 27, thereby causing the top nutator support bearing 37 to move in a straight line. The nutator support bearing 37 surface pivotally and substantially non slidingly mates with a nutator restraint 36 defined by the center bottom surface of the nutator 33.

Figure 11:
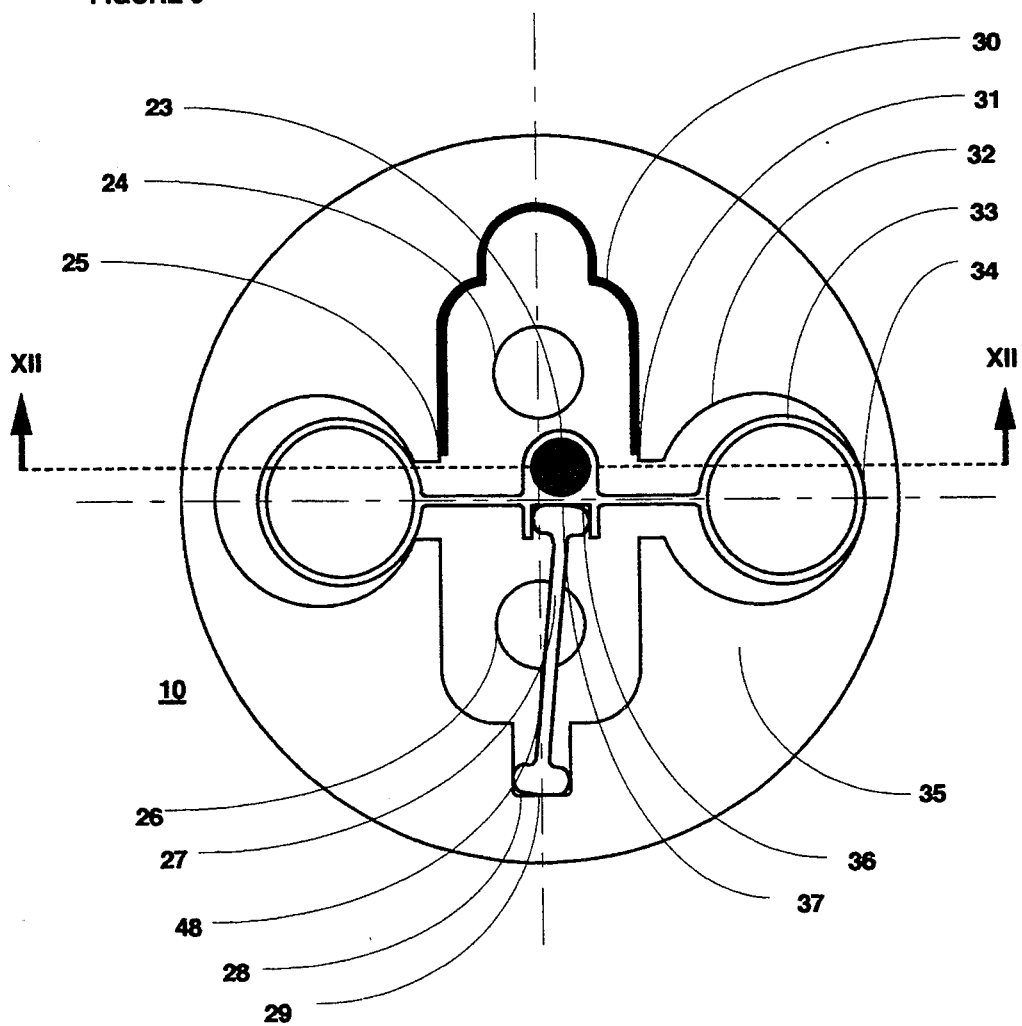
FIG. 11 is a cutaway view of the positive displacement nutating device of FIG. 2 depicting the motion of the magnetic element mass in a straight line and including a stator.
Figure 12:
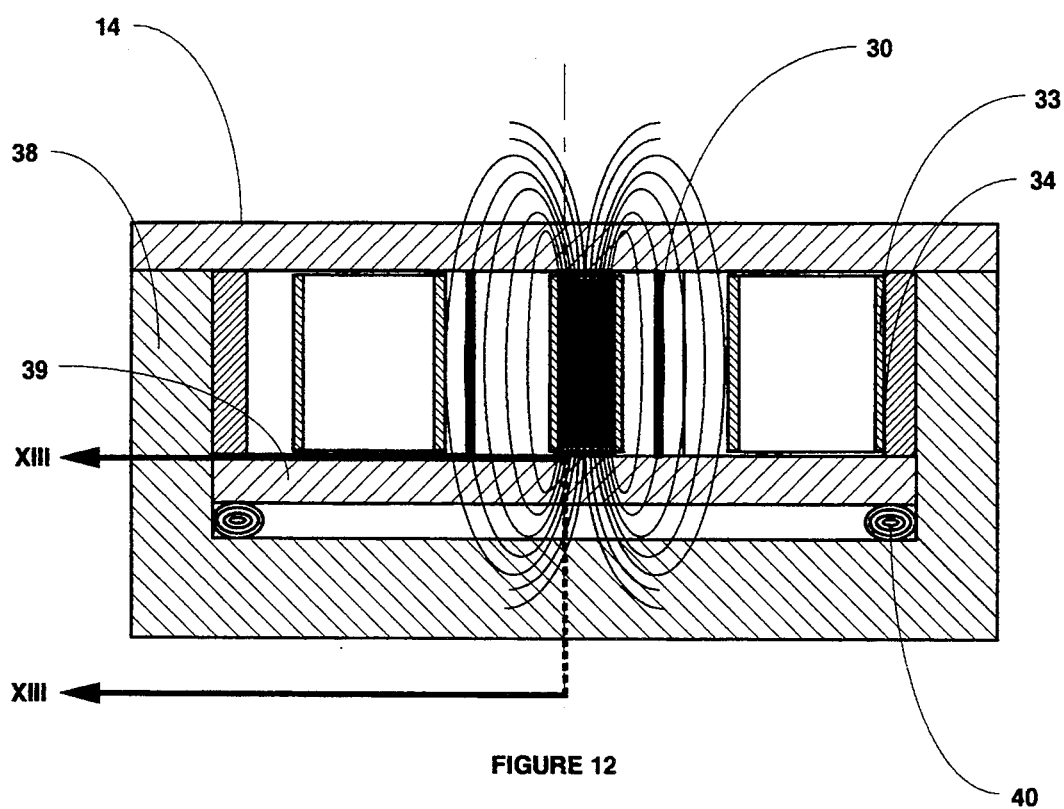
FIG. 12 is a cutaway view of the positive displacemet nutating device of FIG. 1 further including a balance plate and spring force mechanism.

A positive displacement device (FIG. 12) has a balance plate 39 bearing on the basic elements of the positive displacement device 10 by means of a resilient spring 40 force eliminating or minimizing effects of internal pressure upon the accuracy of the device 10 and of mechanical forces used to maintain the integrity between the The basic elements on which the balance plate 39 bears are best shown FIG. 11 , and are: the body 35, the nutator 33, and the beam 27. housing members 38, 14 of the positive displacement device 10.

A positive displacement device 10 includes static elements 30 which provide magnetic attraction to the moving elements 23, 33 effecting an additive influence of sealing between the static elements 30 and moving elements 23, 33 with consequential improvement in positive displacement qualities.

Examples of the preferred embodiment of the invention has been described herein. Other examples will be obvious to those skilled in the art. The invention is limited only by the following claims.

I claim:

1. A nutating positive displacement device including the combination of a nutator capable of nutating within a nutating chamber defined by the interior surface of the body of the positive displacement device between an inlet into and an outlet out of the positive displacement device, an inverted pendulous, low friction, substantially non-sliding nutator vertically elongated double pivoting fulcrum, wherein:

the fulcrum comprises a bottom base coupled to a central beam coupled to a top nutator support bearing surface, the bottom of the fulcrum comprises a pivoting base pivotally and substantially non slidingly mating with a base receptacle defined by a body interior surface, the base coupled to the fulcrum beam which in turn supports the fulcrum nutator support bearing surface, both ends of the substantially non slidng nutator vertically elongated double pivoting fulcrum shaped to an effective diameter whose length is the length of the substantially non sliding nutator vertically elongated double pivoting fulcrum, thereby causing the top nutator support bearing to move in a straight line, and the nutator support bearing surface pivotally and substantially non slidingly mates with a nutator restraint defined by the center bottom surface of the nutator.

2. The positive displacement nutating device of claim 1, which additionally includes:

a cruciform shaped magnetic element wire symmetrical in the x, y and z axes which comprises a sensing arm which comprises a bottom arm, a counterbalance arm comprising a top arm, and two coaxial pivot arms comprising left and right arms, all four arms extending from a center point, wherein the magnetic element wire has a small moment of inertia, wherein the ends of the right and left arms are non-rigidly rotatably coupled to pivot means;

a moving magnetic element mass fixedly coupled to a moving element of the nutator proximate to the end of the bottom sensing arm of the magnetic element wire but separated from the magnetic element wire by a magnetically permeable barrier which moving magnetic element by moving causes the magnetic element wire to move by tracking the moving magnetic element mass, wherein the moving magnetic element mass is one of ferro-magnetic or a permanent magnet and the magnetic element wire is the other of a permanent magnet or ferro-magnetic; and sensing means sense the movement of the magnetic element wire.

3. The invention of claim 2, further including:

a third magnetic element which comprises a permanent magnet selectively fixedly positioned adjacent the magnetic element wire to amplify or dampen the amplitude of movement of the magnetic element wire as a function of the movement of the magnetic element mass.

4. A positive displacement device which comprises at least one housing in which a nutator capable of nutating within a nutating chamber defined by the interior surface of the body of the positive displacement device between an inlet into and an outlet out of the positive displacement device, an inverted pendulous, low friction, substantially non-sliding nutator vertically elongated double pivoting fulcrum, additionally including a balance plate bearing on the body statically, and on the nutator and pivoting fulcrum dynamically by means of a resilient spring force eliminating or minimizing effects of internal pressure upon the accuracy of the device and of mechanical forces used to maintain the integrity between the housings of the positive displacement device.

* * * * *